(12) United States Patent  (10) Patent No.: US 8,794,468 B2
Bramson  (45) Date of Patent: Aug. 5, 2014

(54) FUEL FILLER TUBE ANTI-SIPHON DEVICE

(75) Inventor: Eric David Bramson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 644 days.

(21) Appl. No.: 12/426,974

(22) Filed: Apr. 21, 2009

(65) Prior Publication Data

US 2010/0264138 A1 Oct. 21, 2010

(51) Int. Cl.
*B65D 47/02* (2006.01)
*B60K 15/04* (2006.01)

(52) U.S. Cl.
CPC .................... *B60K 15/0403* (2013.01)
USPC ......................................... 220/86.3; 220/86.1

(58) Field of Classification Search
USPC ............ 220/86.1, 86.2, 86.3, 4.14, 562, 86.4; 137/215, 216.1, 216.2
See application file for complete search history.

(56) References Cited

U.S. PATENT DOCUMENTS

| 1,306,421 | A | * | 6/1919 | Feltz ................................. 55/443 |
| 1,589,550 | A | | 6/1926 | Wilcox |
| 1,862,016 | A | | 6/1932 | Houck |
| 1,931,335 | A | | 10/1933 | Terry |
| 2,373,470 | A | | 4/1945 | Hanke |
| 2,496,992 | A | | 2/1950 | Glidden |
| 3,369,695 | A | | 2/1968 | Johnson |
| 4,345,694 | A | * | 8/1982 | Chambers .................... 220/86.3 |
| 2006/0070667 | A1 | * | 4/2006 | Gaynor et al. ................ 137/592 |
| 2008/0257426 | A1 | * | 10/2008 | Spink et al. ................... 137/527 |

FOREIGN PATENT DOCUMENTS

DE   10 222 097   2/2004
IT        471488   5/1952

* cited by examiner

*Primary Examiner* — Jeffrey Allen
(74) *Attorney, Agent, or Firm* — Julia Voutyras; Alleman Hall McCoy Russell & Tuttle LLP

(57) ABSTRACT

A fuel filler tube having a plurality of spaced ribs disposed within walls of the tube, the ribs being staggered along a length of the tube. The plurality of ribs span is disposed across opposing wall portions of the tube.

7 Claims, 8 Drawing Sheets

FUEL FILLER TUBE ANTI-SIPHON DEVICE

TECHNICAL FIELD

This invention relates generally to fuel fill tube anti-siphon devices.

BACKGROUND

As is known in the art, alcohol-fueled vehicles in North America require a means to prevent siphoning of the fuel out the filler tube pipes. The common method of meeting this requirement is to install a plastic screen in the filler pipe 1 or fuel tank spud. One such filler tube 1 is shown in FIGS. 1A, 2 and 2A. The plastic screen typically is comprised of slender ribs 2 arranged in the cross section of the pipe 1 in a plane orthogonal to the cross section of the pipe and having a spacing distance between the ribs 2 that is sufficient to prevent insertion of a siphon hose 3 (FIG. 1B). Typical rib spacing is 5 mm as required by statute. The ribs 2 are slender in the direction of fuel flow (FIG. 3) in order to minimize the restriction they impose on fuel flow yet prevent a siphon 3 from reaching down into the fuel tank, as shown in FIG. 1B. Nevertheless, the ribs consume some of the flow area, and the flow must pass between the ribs 2. This raises the local velocity of the fluid and increases restriction, and thus the pressure drop across the filler pipe, as shown in FIG. 3. Increased pressure drop can cause dispensed fluid to back up the pipe 1 and prematurely shut off the dispenser nozzle. Thus, it is desired to meet the anti-siphon requirement while introducing the minimum possible flow restriction. While it is possible to simply increase the diameter of the filler tube to reduce restriction, that action could lead to difficulty packaging the filler pipe, increased manufacturing cost, and problems forming a liquid seal in the filler pipe as required to avoid vapors escaping out the top of the pipe during refueling.

SUMMARY

In accordance with the present invention, a fuel filler tube is provided having a plurality of spaced ribs disposed within walls of the tube, the ribs being staggered along a length of the tube.

With the ribs being staggered along the axial dimension of the pipe, the flow restriction arising from their presence is reduced.

In one embodiment, a fuel filler tube is provided having a plurality of ribs spanning across opposing wall portions of the tube, the ribs being staggered along a length of the tube.

In one embodiment, a fuel filler tube is provided having a plurality of spaced ribs disposed within walls of the tube, such ribs being disposed in the path of fuel introduced into the tube, at least one of said ribs being disposed downstream of the path of the fuel relative to another one of the ribs.

In one embodiment, a fuel filler tube is provided having a plurality of spaced ribs, the ribs having leading edges disposed in a plane oblique to a direction of flow of fuel passing into the tube.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
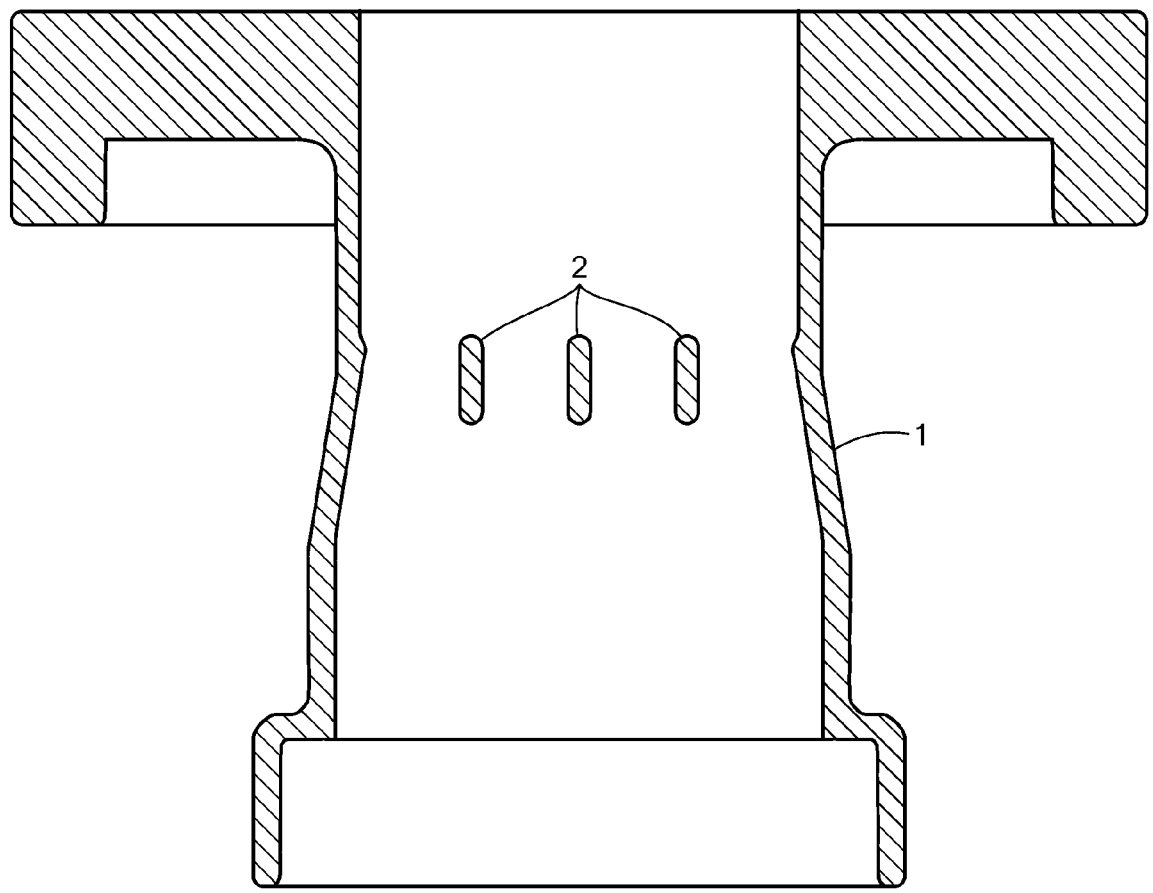
FIG. 1A is a side cross-sectional view of a fuel filler tube having an anti-siphon device according to the PRIOR ART.
Figure 1B:
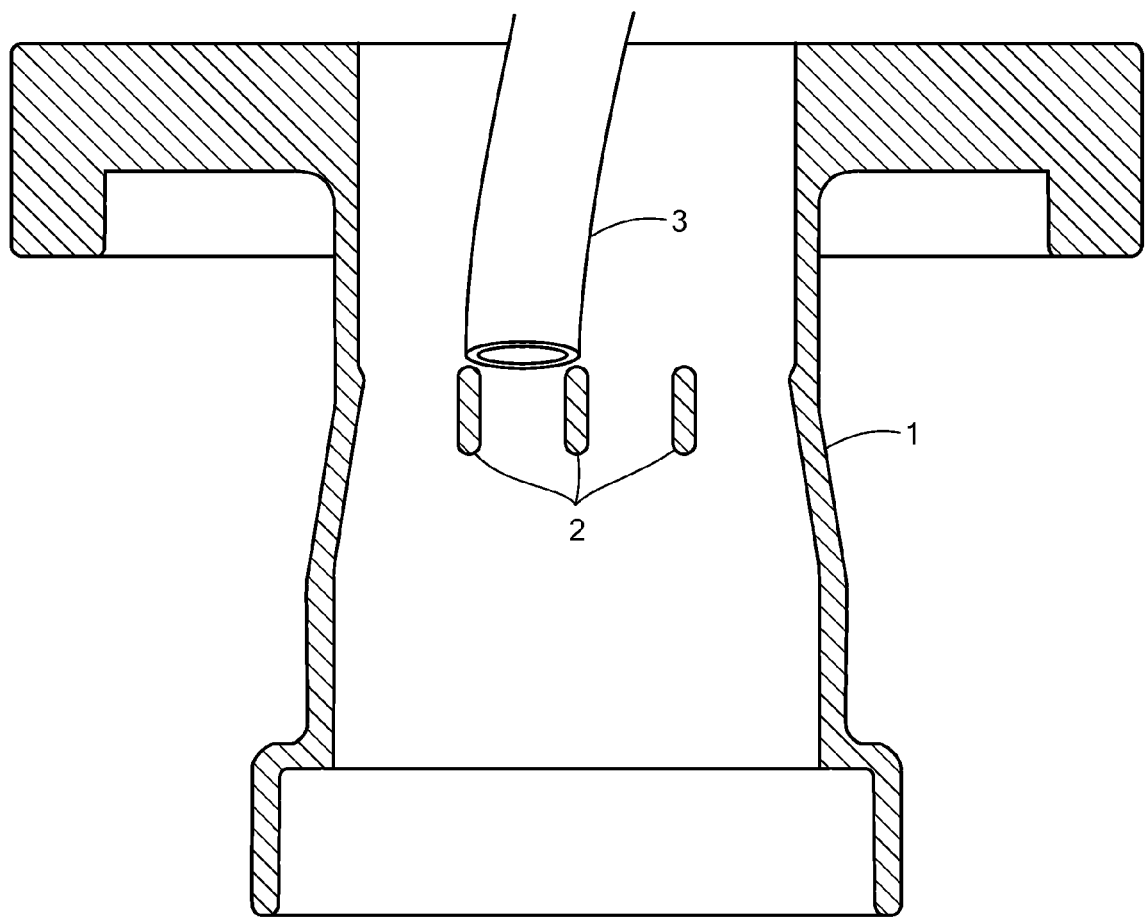
FIG. 1B is a side cross-sectional view of the fuel filler tube of FIG. 1A having an anti-siphon device according to the PRIOR ART, here showing insertion of a siphon tube blocked by the anti-siphon device.
Figure 2:
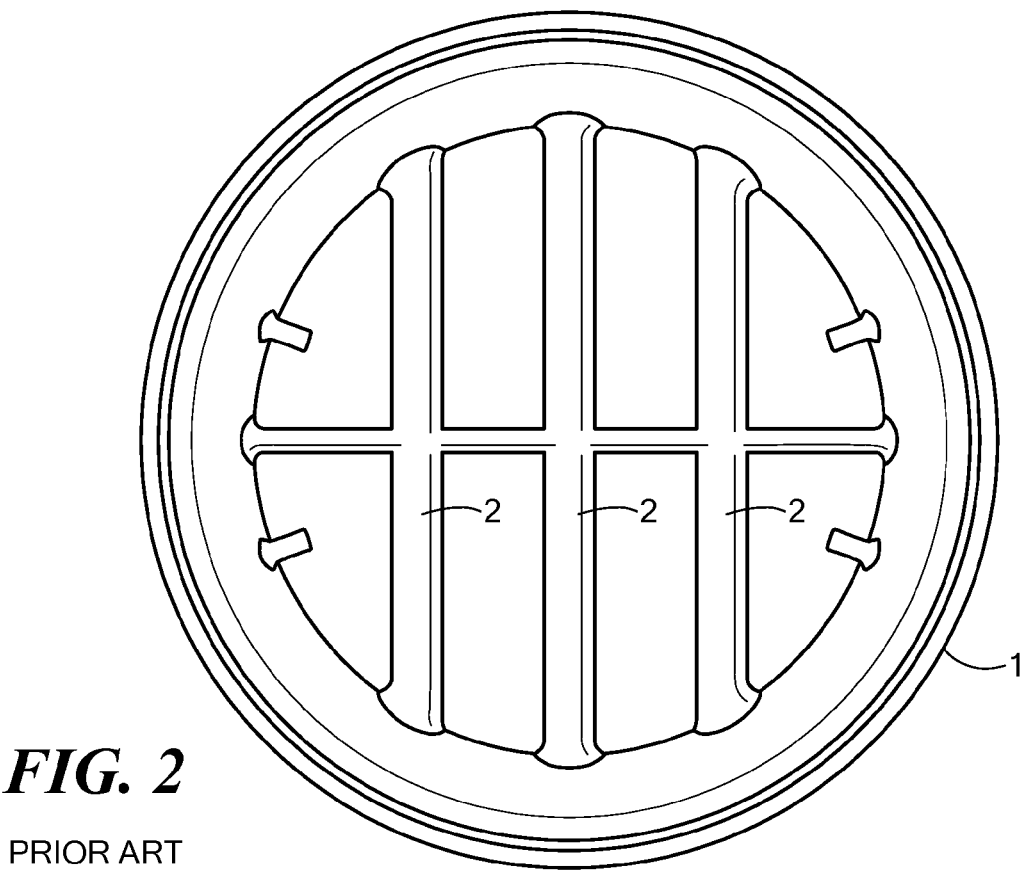
FIG. 2 is a top view of a fuel filler tube according to the PRIOR ART.
Figure 2A:
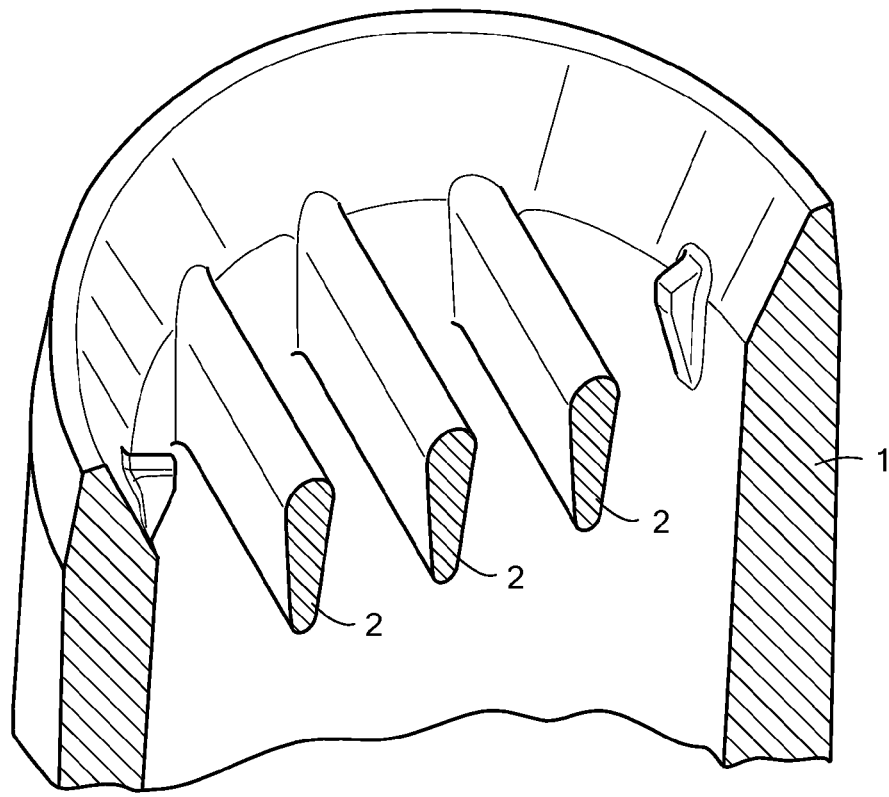
FIG. 2A is a top, isometric, partially broken away view of the fuel filler tube of FIG. 2 according to the PRIOR ART.
Figure 3:
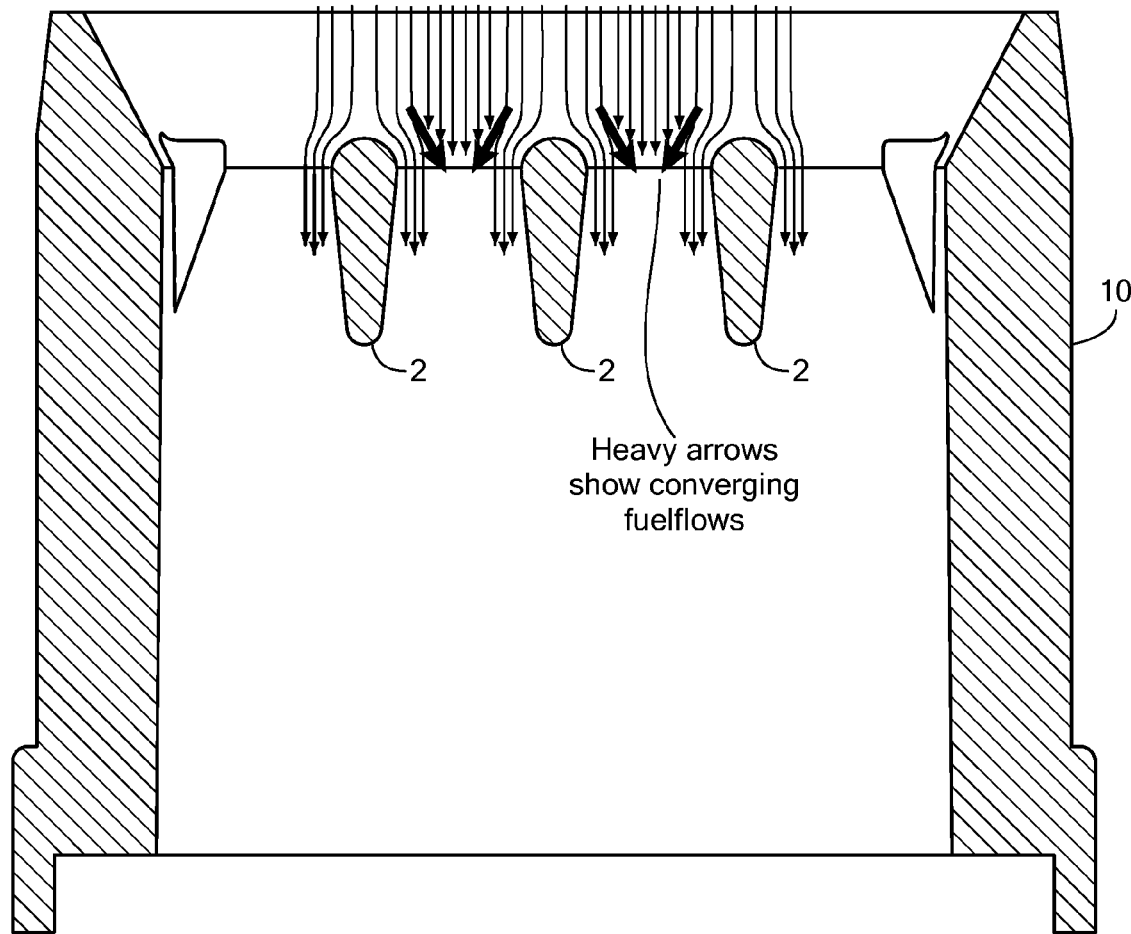
FIG. 3 is a side cross-sectional view of the interior of a fuel filler tube having an anti-siphon device according to the PRIOR ART, and showing the effect of the anti-siphon device on fuel flow.
Figure 4:
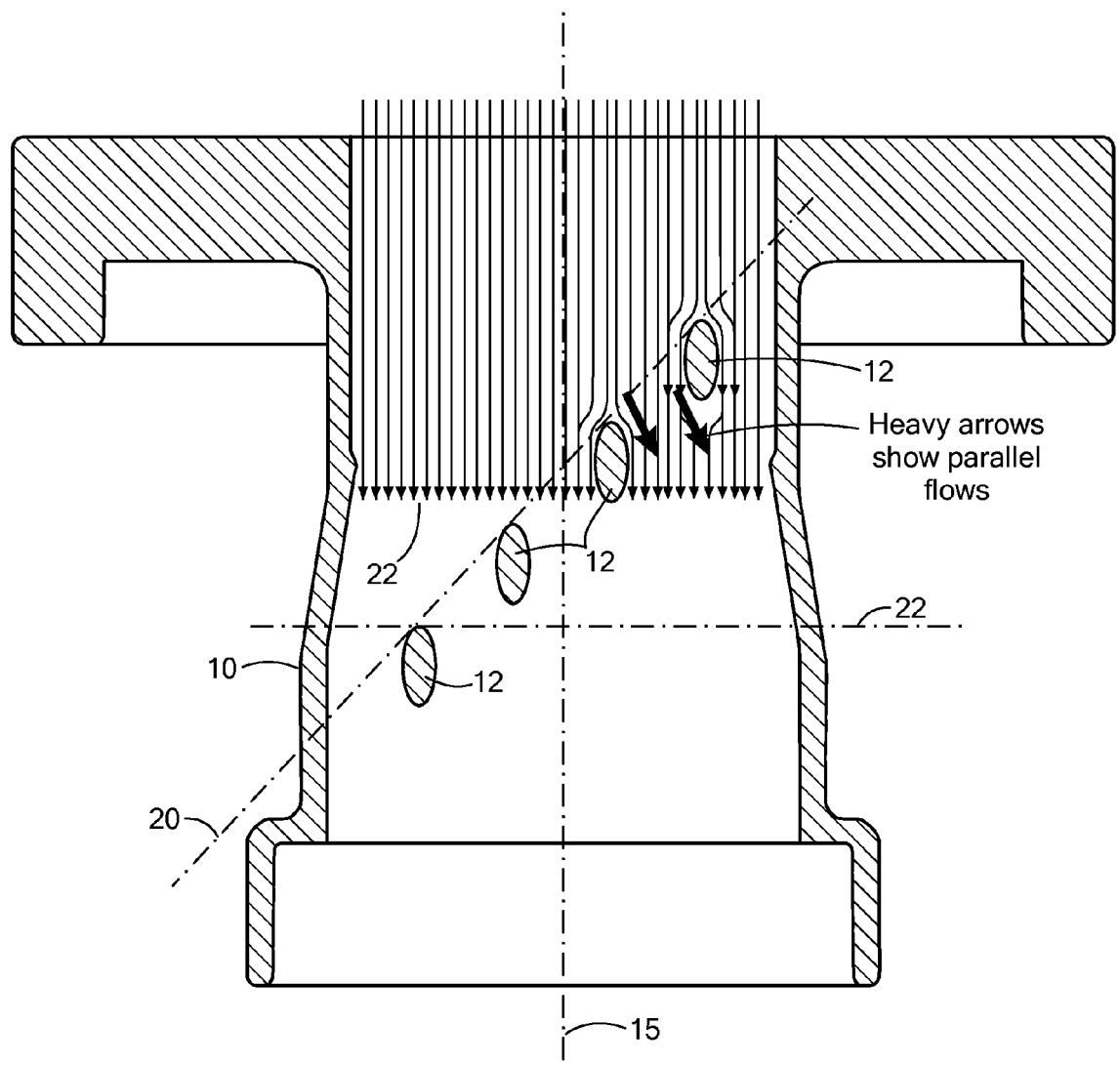
FIG. 4 is a side cross-sectional view of a fuel filler tube having an anti-siphon device according to the invention.
Figure 5:
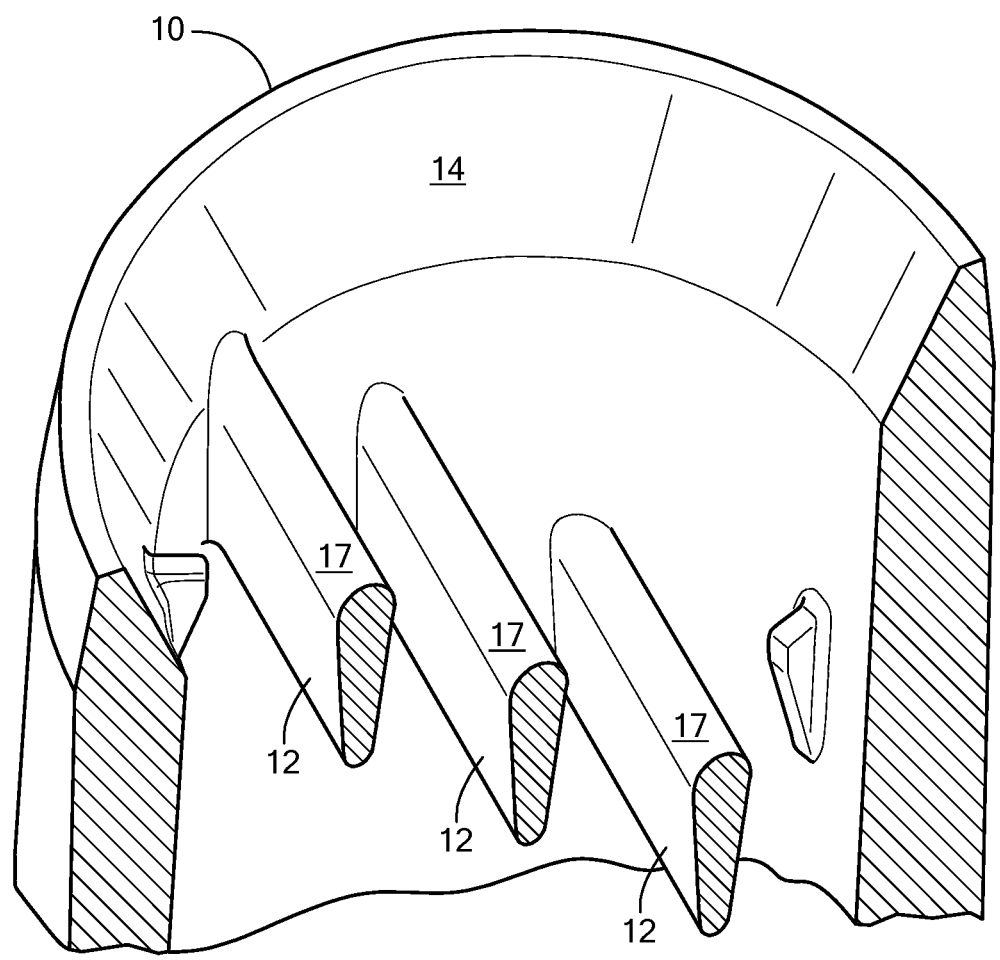
FIG. 5 is a top, isometric, partially broken away view of the fuel filler tube according to the invention.

Referring now to FIGS. 4 and 5, a fuel filler tube 10 is shown provided having a plurality of spaced ribs 12 disposed within walls $14_{[e1]}$ of the tube 10, the ribs 12 being staggered along a length or longitudinal axis 15 of the tube 10. The plurality of ribs 12 span across opposing wall portions of the tube 10. Thus, the ribs 12 are being disposed in a path (i.e., axis 15) of fuel introduced into the tube 10, at least one of said ribs 12 being disposed downstream of the path 15 of the fuel relative to another one of the ribs 12. The ribs 12 have leading edges 17 (FIG. 5) disposed in a plane 20 oblique to a direction 15 of flow of fuel passing into the tube 10.

The ribs 12 are staggered along the axial dimension (i.e., length 15) of the tube 10 in order to reduce the flow restriction arising from their presence.

Figure 6:
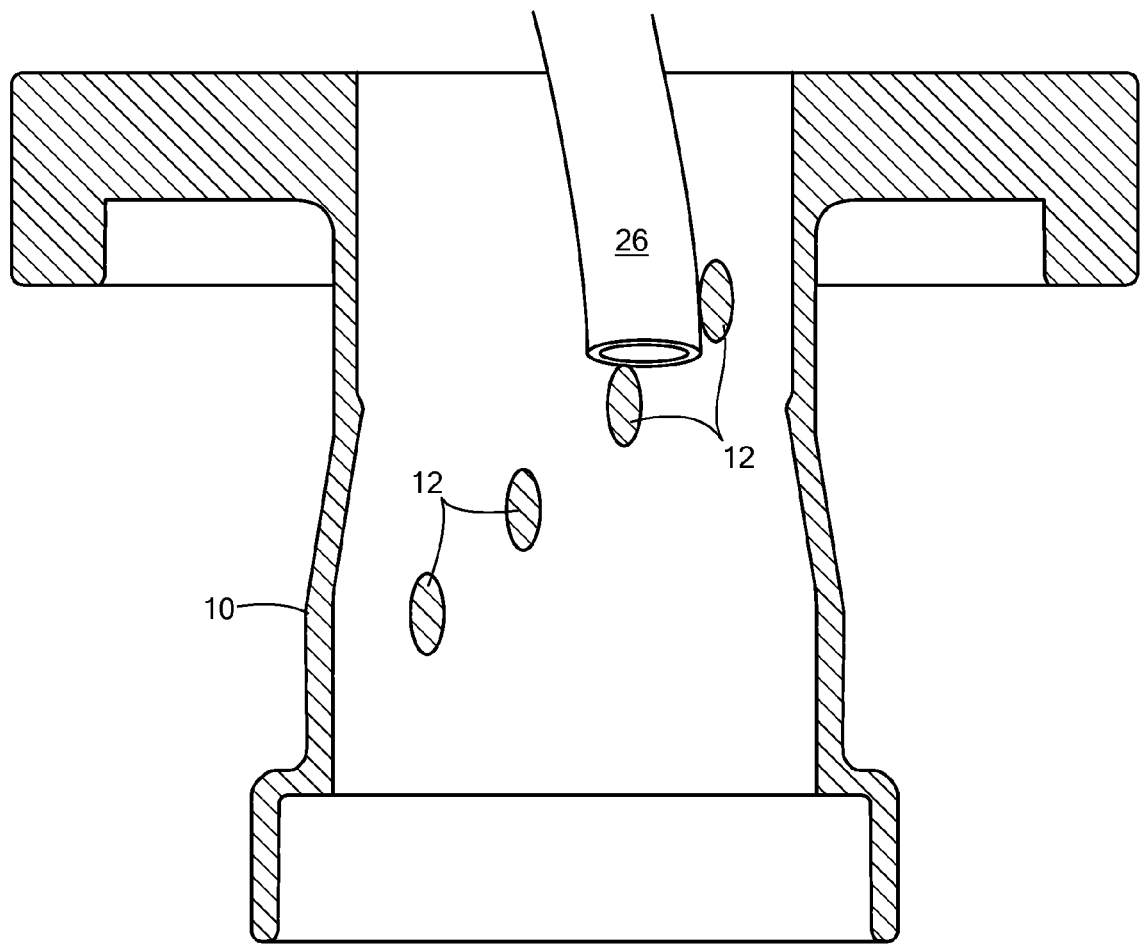
FIG. 6 is a side cross-sectional view of the fuel filler tube of FIG. 4 having an anti-siphon device according to the invention, here showing insertion of a siphon blocked by the anti-siphon device.

The fuel filler tube 10 is an anti siphon device with the ribs 12 positioned in the flow stream to prevent insertion of a 5.2 mm Outside Diameter (OD) siphon tube 26 (e.g., siphon) as shown in FIG. 6; however, the ribs 12 are not arranged in a plane orthogonal to the cross section 22 of the tube 10 but rather the ribs 12 leading edges are disposed in a plane 20 oblique to a direction 15b of flow of fuel passing into the tube 10 (i.e., oblique to a plane 22 disposed in the cross section of the tube 10. The ribs 12 are staggered along the axial dimension 15 of the tube 10 in order to reduce the flow restriction arising from their presence. The maximum spacing between ribs 12 is less than 5.2 mm.

With such an arrangement, the fuel flow encounters only a portion of the restriction in any given part of the tube 10, clearing that restriction before encountering the next successive portion of the tube 10 (FIG. 4). Because the flow does not need to crowd in between all the ribs 12 at once, because the ribs 12 are staggered along the axial dimension of the tube 10, the local velocity in the plane containing a rib 12 remains low, and the pressure drop remains low.

Figure 7:
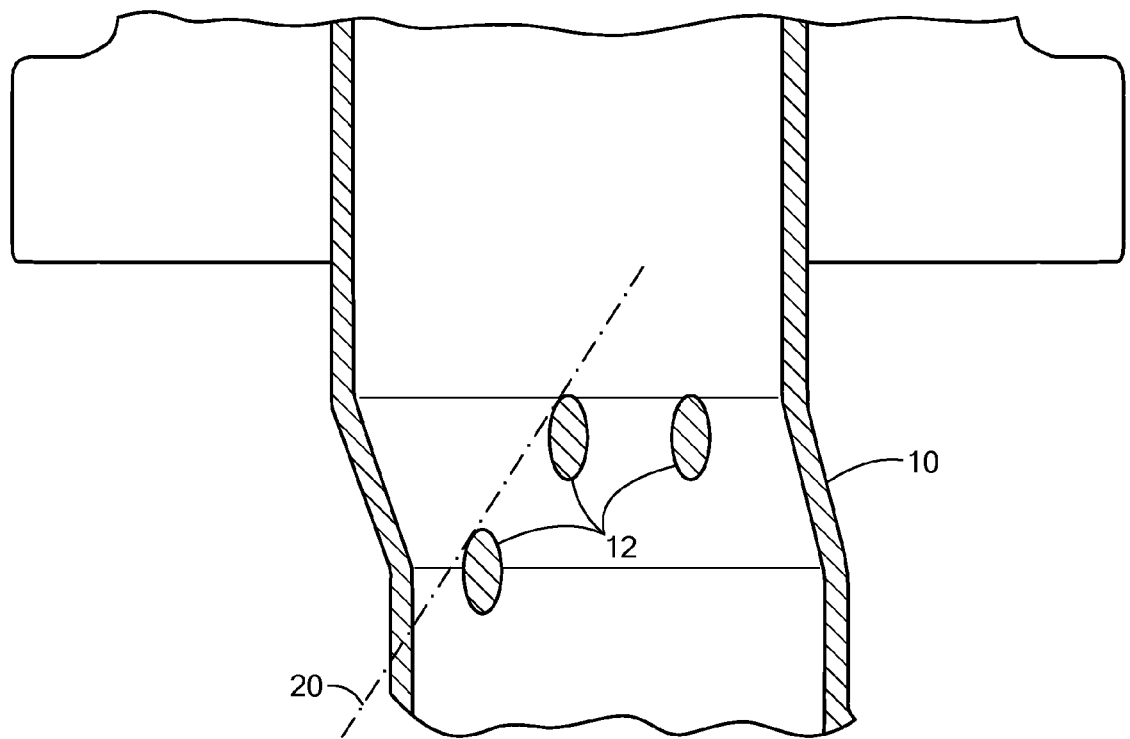
FIG. 7 is a side cross-sectional view of a fuel filler tube having an anti-siphon device according to an alternative embodiment of the invention.

An alternative embodiment is shown in FIG. 7. Here, not all ribs are downstream one from the other.

A number of embodiments of the invention have been described. Nevertheless, it will be understood that various modifications may be made without departing from the spirit and scope of the invention. For example, the ribs 12 could be contained in a separate plastic ring, not shown, that can be inserted into the inside diameter (ID) of a metal tube 10 or into the ID of a rubber hose-like tube 10. The rib design can also be incorporated in the mold tooling of other plastic components already present in the filler system of fuel tanks, such as the filler spud of the fuel tank.

Accordingly, other embodiments are within the scope of the following claims.

What is claimed is:

1. A fuel filler tube having a plurality of spaced, siphon tube engaging ribs, each one of the ribs having leading edges and wherein the leading edges are parallel to each other and have lengths disposed in a plane oblique to a direction of flow of fuel passing into the tube, the lengths of each one of the ribs being disposed at a different level along length of the tube, the leading edges being disposed in the plane at different distances from a wall portion of the tube, each one of the ribs having opposing ends attached only to opposed wall portions of the filler tube, each level having only one siphon tube engaging rib.

2. The fuel filler tube recited in claim 1, wherein the plurality of ribs span across opposing wall portions of the tube.

3. A fuel filler tube having a plurality of spaced, siphon engaging ribs, at least two of the ribs having parallel leading edges with lengths disposed in a plane oblique to a direction of flow of fuel passing into the tube, the leading edges being positioned to intercept a siphon tube insertion into the tiller tube, each one of the ribs being disposed at a different level along a length of the tube and wherein each one of the levels has therein only one siphon engaging rib, and wherein each one of the ribs having opposing ends attached only to opposed wall portions of the filler tube, the ribs having leading edges parallel to each other disposed between the opposing ends with the flow of fluid passing over opposing sides of the ribs, the opposing sides being disposed between the opposing ends of the rib, and wherein the leading edges are disposed in the plane at different distances from a wall portion of the tube.

4. A fuel filler tube having a plurality of spaced, siphon tube engaging ribs for intercepting a siphon tube inserted into the tube, each one of the ribs having leading edges parallel to each other, major portions of the leading edges being disposed in a plane oblique to a direction of flow of fuel passing into the tube, the leading edges of each one of the ribs being disposed at a different level along a length of the tube, the leading edges being disposed in the plane at different distances from a wall portion of the tube, and wherein each one of the levels has therein only one siphon tube engaging rib, and wherein each one of the ribs has opposing ends attached only to opposed wall portions of the filler tube, each one of the ribs having a leading edge disposed between the opposing ends thereof, with a flow of fluid passing over opposing sides of the rib, the opposing sides being disposed between the opposing ends of the rib.

5. The filler tube recited in claim 1, wherein each one of the ribs is attached to the walls of the filler tube at only the opposing ends of such one of the ribs.

6. A fuel filler tube having a plurality of spaced siphon tube engaging ribs, each one of the ribs having a pair of opposing ends attached only to opposed wall portions of the filler tube, each one of the ribs having leading edges disposed between the opposing ends of such one of the ribs, with a flow of fluid passing over opposing sides of the ribs, the opposing sides being disposed between the opposing ends of the ribs, and wherein the leading edges are parallel to each other and have lengths disposed in a plane oblique to a direction of the flow of fuel passing into the tube, and are disposed in the plane at different distances from a wall portion of the tube, the lengths of each one of the ribs being disposed at a different level along the length of the tube, each one of the ribs having opposing ends attached only to opposed wall portions of the filler tube, each level having only one siphon engaging rib.

7. A fuel filler tube having only a single row of diagonally spaced ribs, at least two of the ribs having leading edges in parallel with each other, wherein the leading edges have lengths disposed along a plane oblique to a direction of flow of fuel passing into the tube, the leading edges being positioned to intercept a siphon tube inserted into the filler tube, each one of the ribs being disposed at a different level along a length of the tube and wherein each one of the levels has therein only one of the ribs, each one of the ribs having opposing ends attached only to diametrically opposed wall portions of the filler tube, the leading edges of the ribs being disposed between the opposing ends with the flow of fluid passing over opposing sides of the ribs, the opposing sides being disposed between the opposing ends of the rib, and wherein the leading edges are disposed in the plane at different distances from a wall portion of the tube.

* * * * *